United States Patent
Tarnofsky

[11] Patent Number: 6,131,426
[45] Date of Patent: *Oct. 17, 2000

[54] ANTI-THEFT DEVICE FOR ATTACHMENT OF AN AUTOMOBILE STEERING WHEEL

[76] Inventor: Melvin Tarnofsky, 217 E. 7th St., Brooklyn, N.Y. 11218

[*] Notice: This patent issued on a continued prosecution application filed under 37 CFR 1.53(d), and is subject to the twenty year patent term provisions of 35 U.S.C. 154(a)(2).

[21] Appl. No.: 09/158,971

[22] Filed: Sep. 18, 1998

[51] Int. Cl.[7] .................................................. B60R 25/02
[52] U.S. Cl. ............................ 70/209; 70/226; 70/164
[58] Field of Search .............................. 70/209, 211, 212, 70/225, 226, 237, 238, 163, 164

[56] References Cited

U.S. PATENT DOCUMENTS

| | | | |
|---|---|---|---|
| 3,462,982 | 8/1969 | Moore | 70/209 |
| 4,750,341 | 6/1988 | Laguna | 70/209 |
| 5,214,944 | 6/1993 | Wolthoff | 70/226 |
| 5,275,030 | 1/1994 | Cole | 70/209 |
| 5,450,736 | 9/1995 | Volkmer | 70/226 |
| 5,491,990 | 2/1996 | Von-Lambert | 70/209 |
| 5,548,983 | 8/1996 | Hart | 70/209 |
| 5,555,754 | 9/1996 | Ferrante | 70/226 |
| 5,588,316 | 12/1996 | Jones | 70/209 |
| 5,778,709 | 7/1998 | Hsu | 70/209 |
| 5,836,186 | 11/1998 | Winner, Jr. | 70/209 |
| 5,842,361 | 12/1998 | Banez | 70/209 |
| 5,953,941 | 9/1999 | Freund | 70/209 |

FOREIGN PATENT DOCUMENTS

| | | | |
|---|---|---|---|
| 2037680 | 7/1980 | United Kingdom | 70/212 |
| 2206552 | 1/1989 | United Kingdom | 70/226 |

*Primary Examiner*—Darnell Boucher

[57] ABSTRACT

An anti-theft device for attachment to an automobile steering wheel designed to limit access to an automobile steering wheel, including the rim of the steering wheel. The device consists of a skeletonized metal structure with a size and shape similar to, but fitting over and on top of, an automobile steering wheel. The device is securely attached to a conventional automobile steering wheel bar lock. The device is casehardened to substantially prevent cutting through the device with a hacksaw. The device helps to prevent the theft of the automobile by keeping the steering wheel immobile.

12 Claims, 4 Drawing Sheets

ANTI-THEFT DEVICE FOR ATTACHMENT OF AN AUTOMOBILE STEERING WHEEL

BACKGROUND—FIELD OF THE INVENTION

This invention relates to automobile anti-theft devices, specifically to such devices which attach to an automobile steering wheel so as to prevent steering the automobile.

BACKGROUND—DESCRIPTION OF PRIOR ART

The prior art of automobile anti-theft devices for attachment to an automobile steering wheel includes:

| Patent number | 1,154,389 | Inventor Fogalsang 9/1915 |
| Patent number | 1,329,913 | Inventor McGuire 2/1920 |
| Patent number | 1,368,054 | Inventor Recher 2/1921 |
| Patent number | 1,395,532 | Inventor Tilden 11/1921 |
| Patent number | 3,982,602 | Inventor Gorman 9/1976 |
| Patent number | 5,007,259 | Inventor Mellard 4/1991 |
| Patent number | 5,353,614 | Inventor Anderson 11/1994 |
| Patent number | 5,778,709 | Inventor Hsu 7/1998 |
| Patent number | 5,842,361 | Inventor Banez 12/1998 |
| Patent number | 5,588,316 | Inventor Jones 12/1996 |
| Patent number | 5,555,754 | Inventor Ferrante 9/1996 |
| Patent number | 5,450,736 | Inventor Volkar 9/1995 |
| Patent number | 5,836,186 | Inventor Winner 11/1998 |
| Patent number | 5,491,990 | Inventor Von Lambert 2/1996 |
| Patent number | 5,214,944 | Inventor Wolthoff 6/1993 |
| Patent number | GB2,206,552A | Inventor Hedges 1/1989 |
| Patent number | 4,750,341 | Inventor Laguna 6/1988 |
| Patent number | GB2,037,680A | Inventor Casoni 7/1980 |
| Patent number | 5,548,983 | Inventor Hart 8/1996 |
| Patent number | 3,462,982 | Inventor Moore 8/1969 |
| Patent number | 5,275,030 | Inventor Cole 1/1994 |

None of the known automobile anti-theft devices for attachment to an automobile steering wheel is hacksaw-proof. Thus, these automobile anti-theft devices provide no protection against a thief with a hacksaw. The known automobile anti-theft devices that attach to an automobile steering wheel to prevent steering the automobile depend on the steering wheel to hold the anti-theft device in place. An automobile thief can easily cut through the steering wheel rim with a hacksaw and thereby remove the bar lock. None of the known automobile anti-theft devices is structurally capable of being casehardened, as is necessary to resist cutting with a hacksaw. Significantly, cut-resistant materials such as tempered steel, with a hardness less than three thousands of an inch deep, are not hacksaw-proof. The known automobile anti-theft devices cannot be casehardened because they are structurally incapable of surviving the high temperatures necessary for casehardening without distortion of the metal components of the device.

SUMMARY OF THE INVENTION

The present invention overcomes the cited disadvantages described above and others, and provides an automobile steering wheel security device that is effective in protecting an automobile from theft. A primary objective of the present invention is to protect the rim of an automobile steering wheel from being cut through with a hacksaw. This is accomplished by entrapping the steering wheel with a skeletonized metal structure, which protects the steering wheel rim inside and outside with the outer perimeter barrier metal bar and the inner barrier securing metal bar. Additionally, the skeletonized metal structure snugly and securely covers the automobile steering wheel's face and the air bag with horizontal and vertical bars.

The skeletonized metal structure is casehardened to have the degree and depth of hardness necessary to prevent cutting with conventional steel hacksaw blades. The design of the skeletonized metal structure allows it to withstand the high temperatures necessary for casehardening without distortion of the metal components that would prevent the device from fitting snugly and securely over the steering wheel. Specifically, the horizontal and vertical bars provide the structural stability necessary to prevent distortion during the casehardening process.

SEVERAL OBJECTS AND ADVANTAGES OF THE PRESENT INVENTION ARE (a) It has a skeletonized metal structure with metal placed only where it is needed to best protect an automobile steering wheel from hacksaw cutting;
(b) It has a size and shape similar to, but fitting over and on top of, an automobile steering wheel, substantially entrapping the automobile steering wheel under the device;
(c) It is easy to attach and lock onto an automobile steering wheel with a conventional automobile steering wheel bar lock from the front or back of the steering wheel;
(d) It has a shape and a construction suitable to be casehardened in production to be hacksaw-proof, with a defensive outer surface that prevents surface penetration by conventional steel hacksaw blades; and
(e) It is an easy-to-see deterrent, having a strong defensive look of metal bars. Still further objects and advantages will become apparent from a consideration of the ensuing description and drawings.

BEST MODE FOR CARRYING OUT THE INVENTION

Figure 1:
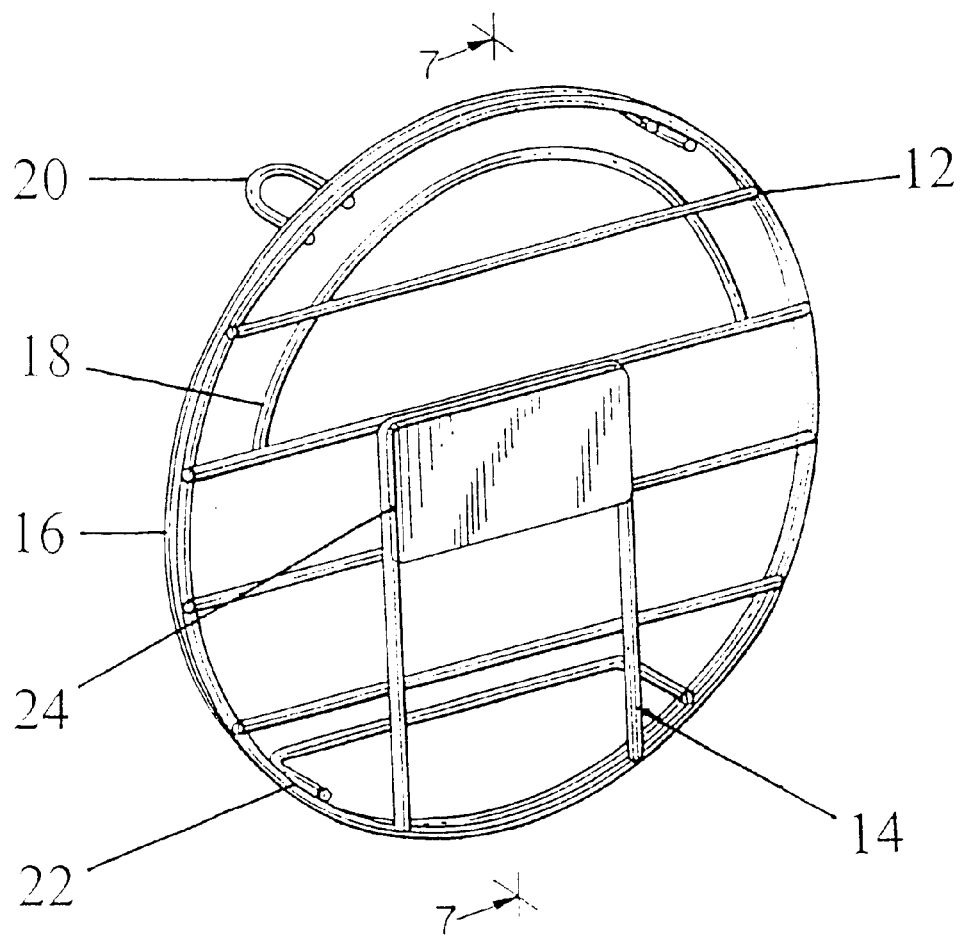
FIG. 1 shows a top front and left side perspective view of the present invention.
Figure 2:
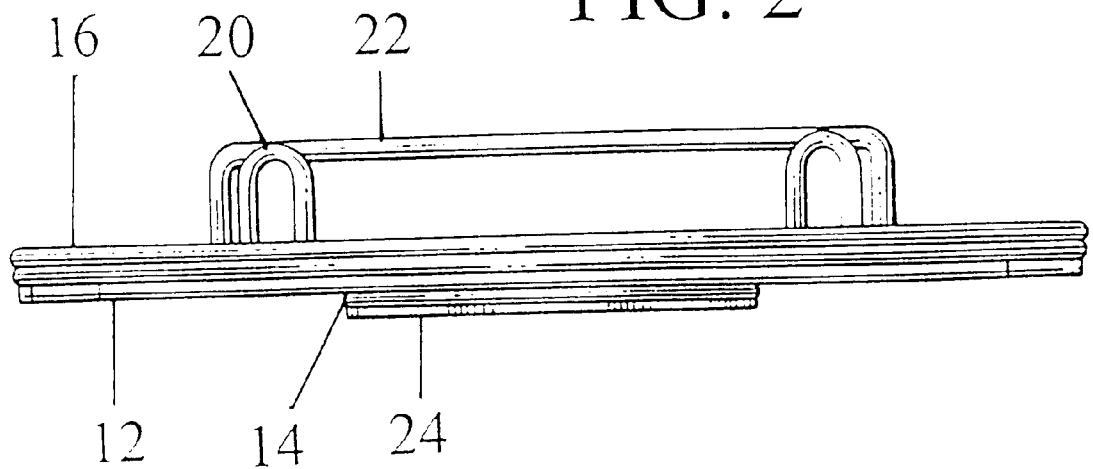
FIG. 2 is a top plan view thereof.
Figure 4:
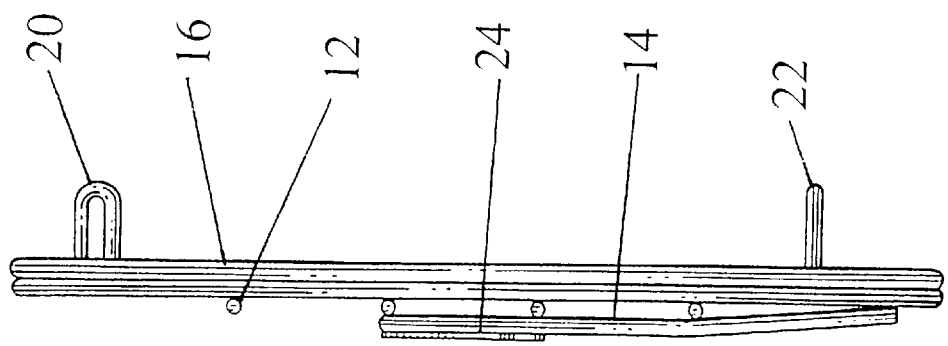
FIG. 4 is a right side view thereof.
Figure 3:
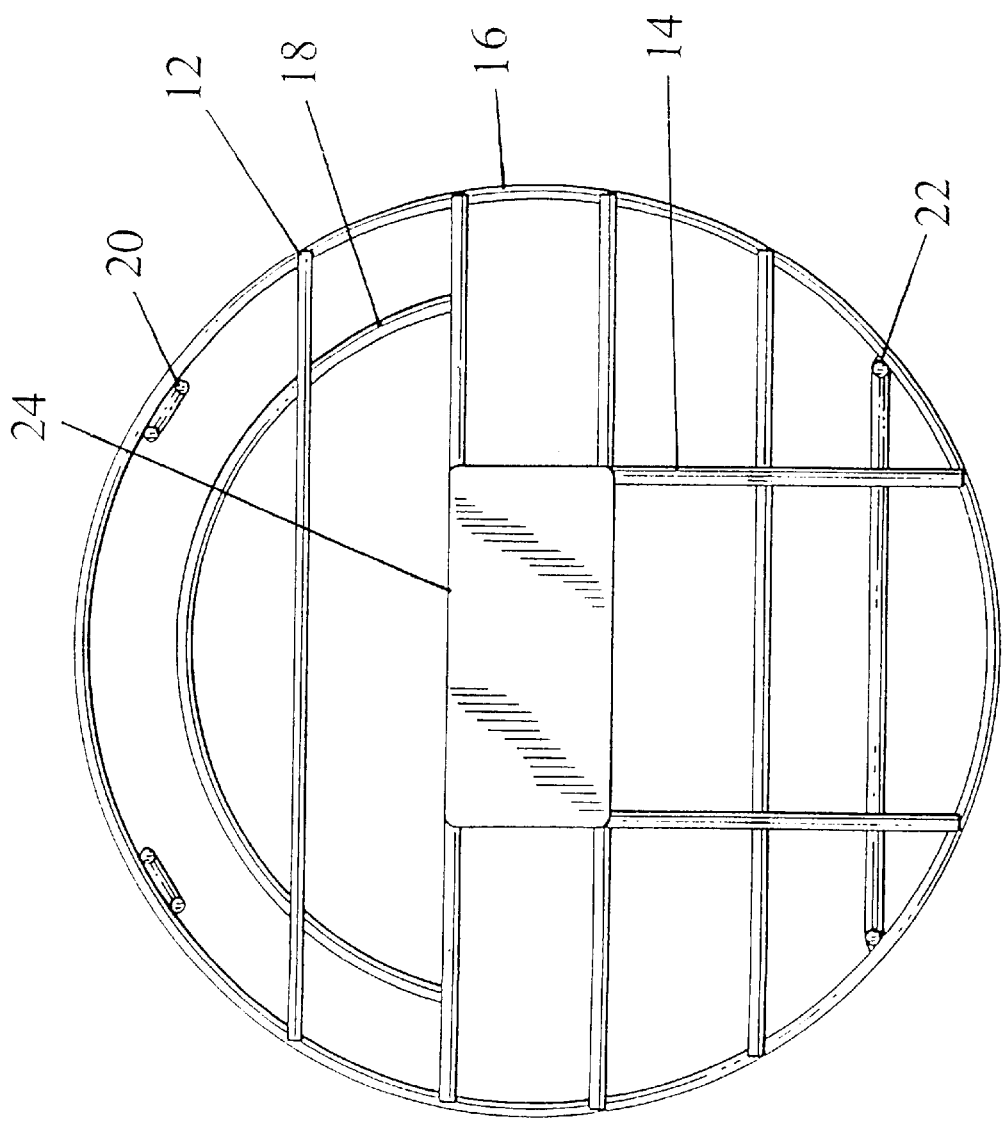
FIG. 3 is a front elevation view thereof.
Figure 5:
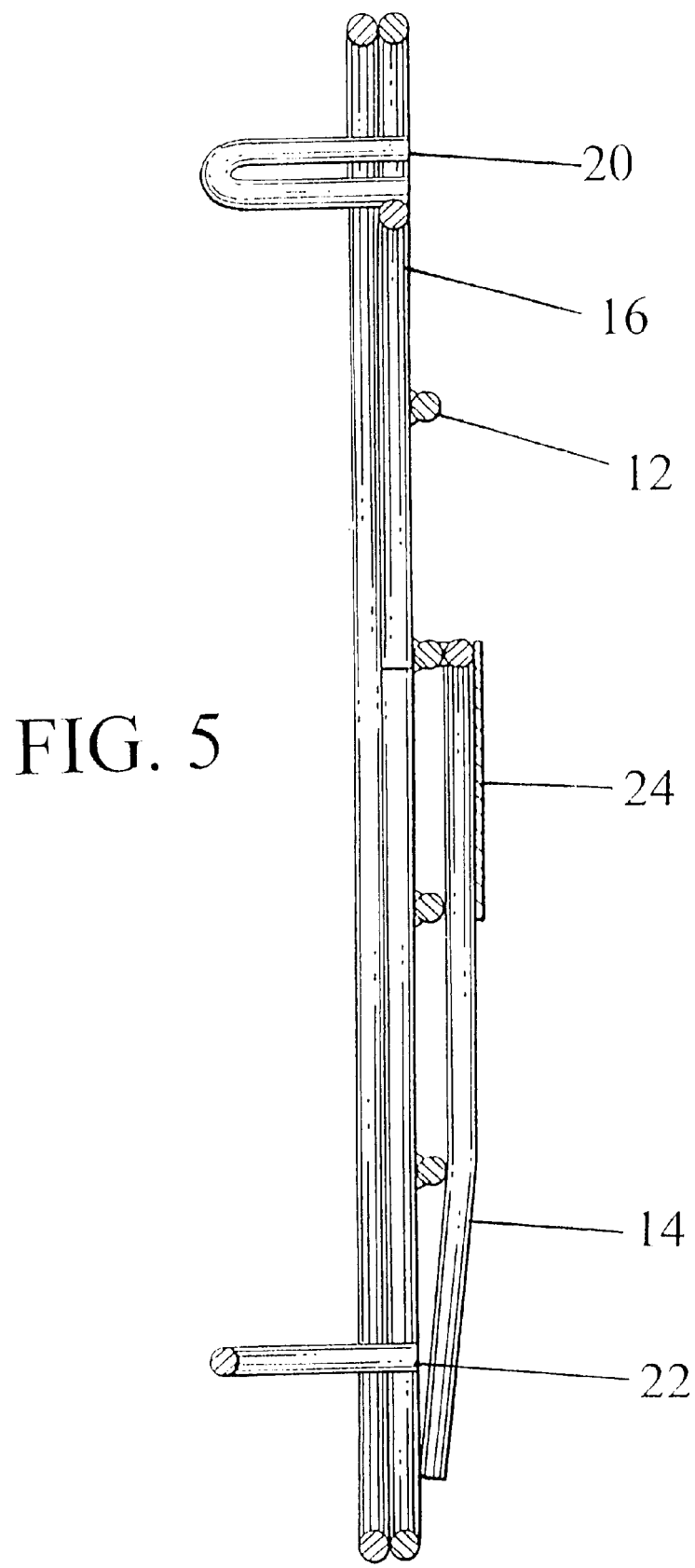
FIG. 5 is a cross-sectional view along the line 7—7 as seen in FIG. 1.
Figure 6:
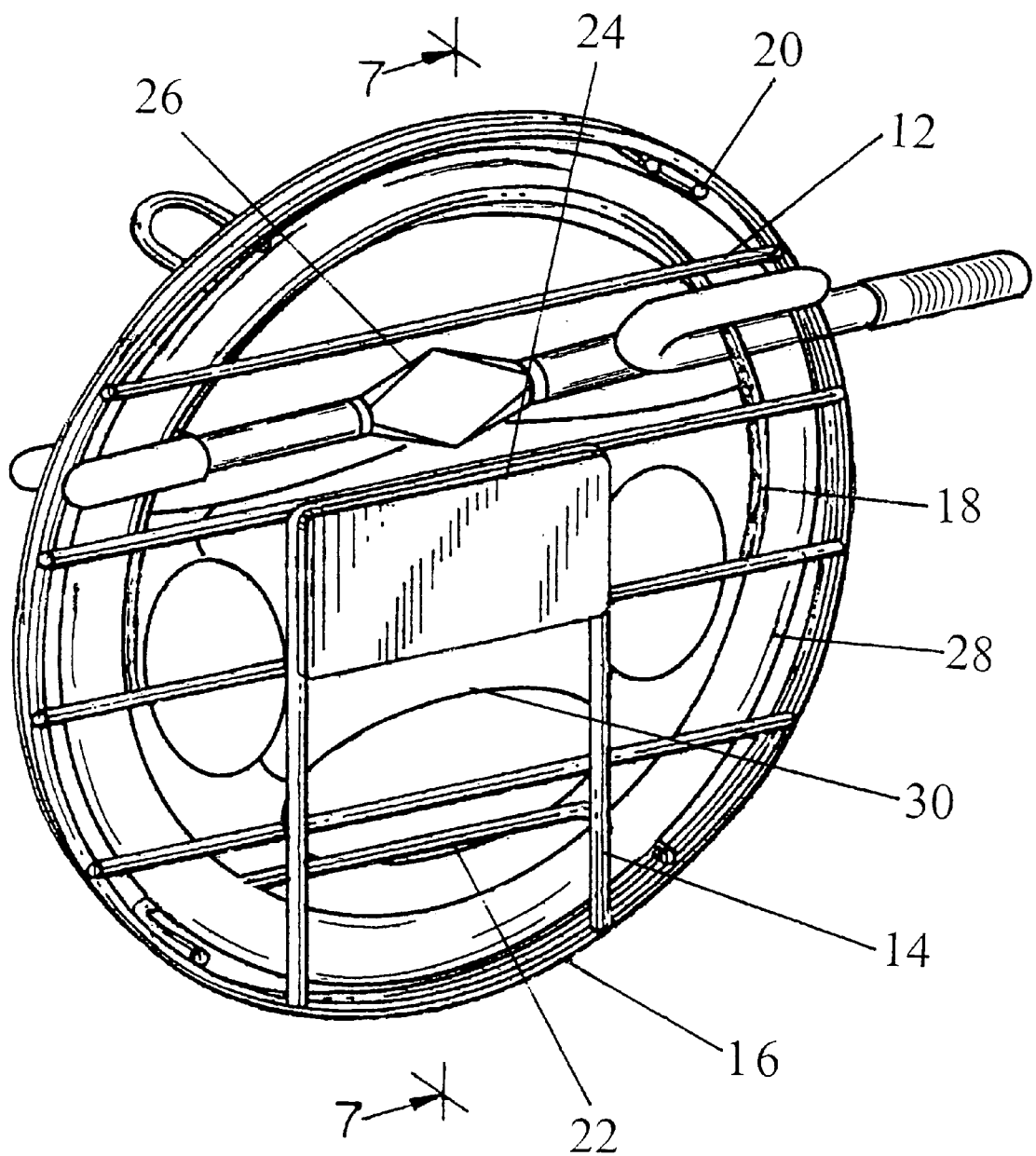
FIG. 6 is a top front and left side perspective view of an embodiment of the present invention, including an automobile steering wheel bar lock 26.

Referring now to the preferred embodiment of the invention for purposes of illustrating the preferred embodiments and not for purposes of limiting the same, FIG. 6 illustrates an automobile anti-theft device that is designed to substantially limit access to an automobile steering wheel, including the rim.

1—The device is a skeletonized metal structure assembled from a plurality of separate metal pieces that are cut to size and bent to the shape of the automobile steering wheel. The device is welded together, having the size and shape to fit over the face of an automobile steering wheel, entrapping the rim of the steering wheel between the device's outer perimeter barrier metal bar 16 and the inner barrier securing metal bar 18 and covering the steering wheel's face and air bag 30 with horizontal metal bar 12 and vertical metal bar 14. The lower half of the automobile steering wheel rim 28 fits between the lower securing metal back bar 22 and the back of the skeletonized metal structure. Centering guide metal bar 20 fits over the steering wheel rim, entrapping the skeletonized metal structure over the automobile steering wheel on opposite ends of the inner barrier securing metal bar 18 to receive a conventional automobile steering wheel bar lock 26 from the back or front of the steering wheel.

2—This device is casehardened in a high-heat commercial process, so that the outer surface of the skeletonized metal structure is as hard as conventional hardened steel tools.

3—An unhardened logo plate 24 is attached.

4—A bright colorful vinyl finish is applied.

Numerous designs of the device can be created that do not have the size or shape of present-day automobile steering wheels.

A skeletonized metal structure is the object of the present invention. Its shape can be rectangular or square, triangular or oblong, parallelogram or oval. A different securing position with different locking devices can be used. It can be folded in half. A skeletonized metal structure that is unhardened and not hacksaw-proof and does not protect 360 degrees of an automobile steering wheel can at least impede its removal by force with conventional tools. A look-alike plastic molded device with no protection against hacksaw cutting can act as a visual deterrent with the look of metal bars. Persons skilled in the art will appreciate that numerous variations and/or modifications may be made without departing from the spirit or scope of the present invention as broadly described. The present embodiments are therefore to be considered in all respects as illustrative and not restrictive.

What is claimed is:

1. A skeletonized metal structure having the size and shape to fit over an automobile steering wheel, comprising:
   (a) a first curved bar fitting around and substantially covering the outside of a rim of said automobile steering wheel,
   (b) a means for securely attaching said metal structure to said automobile steering wheel, and
   (c) a second curved bar fitting within and substantially covering part or all of the inside of said automobile steering wheel rim, whereby said second curved bar extends on either side of said steering wheel beyond a place suitable for attaching an automobile steering wheel bar lock.

2. The skeletonized metal structure of claim 1, wherein said metal structure is casehardened until the outer surface of said metal structure has a degree and depth of hardness that substantially prevents cutting through said metal structure with a steel hacksaw blade.

3. The skeletonized metal structure of claim 1, further including a plurality of approximately vertical and horizontal bars adapted to extend across the front of said automobile steering wheel, said vertical and horizontal bars being attached to said first curved bar.

4. The skeletonized metal structure of claim 3, whereby said approximately vertical and horizontal bars substantially prevent the removal of an air bag contained in said automobile steering wheel.

5. The skeletonized metal structure of claim 2, further including a plurality of approximately vertical and horizontal bars adapted to extend across the front of said automobile steering wheel, said approximately vertical and horizontal bars being attached to said first curved bar and providing a means for said metal structure to withstand the casehardening process without distortion preventing said first curved bar from fitting around and substantially covering the outside of said automobile steering wheel rim and without distortion preventing said second curved bar from fitting within and substantially covering the inside of said automobile steering wheel rim.

6. The skeletonized metal structure of claim 5, whereby said approximately vertical and horizontal bars substantially prevent the removal of an air bag contained in said automobile steering wheel.

7. The skeletonized metal structure of claim 1, in combination with an automobile steering wheel bar lock that attaches to said metal structure and is adapted for securely locking said metal structure to said automobile steering wheel.

8. The skeletonized metal structure of claim 2, in combination with an automobile steering wheel bar lock that attaches to said metal structure and is adapted for securely locking said metal structure to said automobile steering wheel.

9. The skeletonized metal structure of claim 3, in combination with an automobile steering wheel bar lock that attaches to said metal structure and is adapted for securely locking said metal structure to said automobile steering wheel.

10. The skeletonized metal structure of claim 4, in combination with an automobile steering wheel bar lock that attaches to said metal structure and is adapted for securely locking said metal structure to said automobile steering wheel.

11. The skeletonized metal structure of claim 5, in combination with an automobile steering wheel bar lock that attaches to said metal structure and is adapted for securely locking said metal structure to said automobile steering wheel.

12. The skeletonized metal structure of claim 6, in combination with an automobile steering wheel bar lock that attaches to said metal structure and is adapted for securely locking said metal structure to said automobile steering wheel.

* * * * *